March 3, 1942.   C. M. REES   2,275,160
WATER HEATING SYSTEM
Filed Dec. 14, 1937
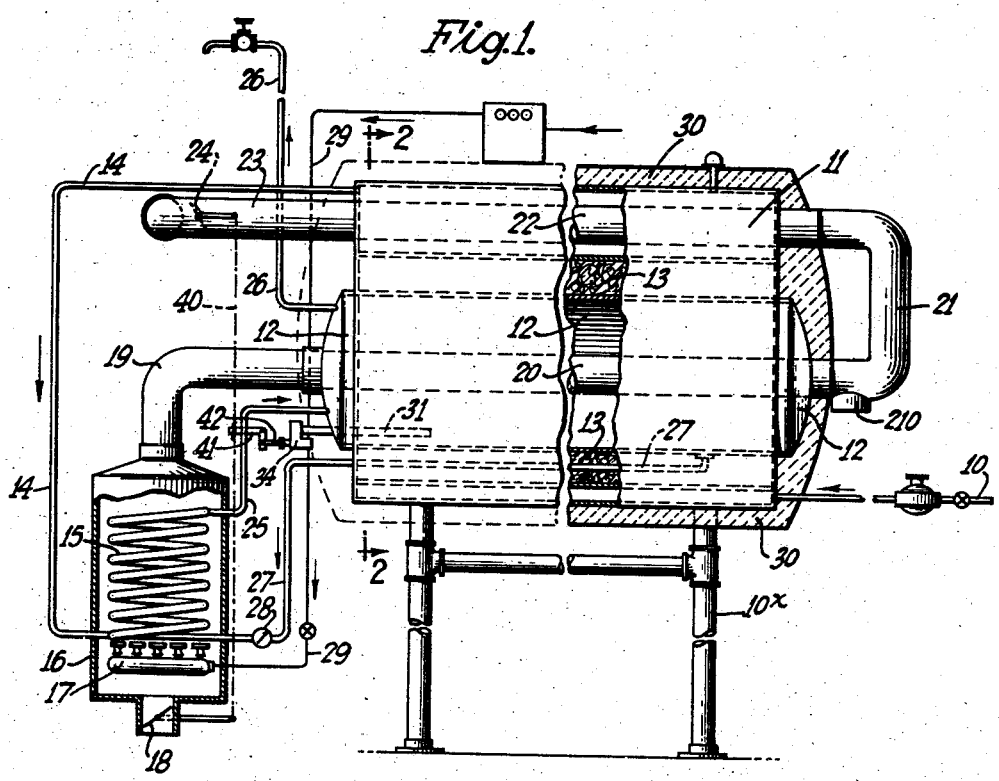
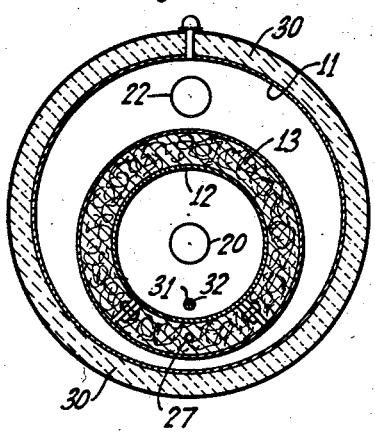
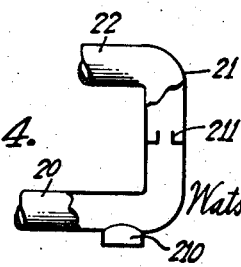
INVENTOR.
Clyde M. Rees.
BY Watson, Bristol, Johnson & Leavenworth
ATTORNEYS.

Patented Mar. 3, 1942

2,275,160

UNITED STATES PATENT OFFICE 2,275,160

WATER HEATING SYSTEM

Clyde Malin Rees, White Plains, N. Y., assignor to George A. Rees, White Plains, N. Y.

Application December 14, 1937, Serial No. 179,626

8 Claims. (Cl. 122—18)

This invention relates to water heating systems, and particularly to systems for heating water for domestic use.

The invention has for its object, generally, to provide a system of the character indicated which is highly efficient and relatively economical in the use of the heating agent employed, and has a relatively simple mechanical construction whereby installation and maintenance costs are relatively low.

More specifically, an object of the invention is to provide a system for heating water for domestic use which includes improved water storage tanks or reservoirs that are adapted to conserve heat and maintain the temperatures without substantial drop over a relatively long period.

Another object is to provide a novel arrangement of water storage reservoirs in series in association with gas water heaters arranged so that quantities of water at graded temperatures are maintained in heat conserving relation therein.

Another object is to provide an arrangement of high and low temperature storage reservoirs for domestic water heaters in nested relation whereby the heat lost through radiation by the water at high temperature is absorbed by the water at low temperature.

Another object is to provide a domestic water heating system, using gas as the heating agent, whereby the low temperature heat of the flue gases is utilized to heat water, as well as the heat of the high temperature flue gases.

Still another object is to provide passages for the supplementary heating of the storage water reservoirs that are at different temperatures by an arrangement employing the flue gases from a gas water heater; the arrangement being such there is a relatively constant temperature difference between each reservoir and the flue gases heating the same whereby there is a high degree of conservation of the heat of the flue gases.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawing, in which:

Fig. 1 is a view, partly in elevation and partly in section, parts being broken away, showing a water heating system of the present invention employing a gas water heater;

Fig. 2 is a sectional view taken on the line 2—2 of Fig. 1;

Fig. 3 is a fragmentary view showing details of the thermostatic device employed in Fig. 1; and Fig. 4 is a fragmentary sectional view of a portion of the gas flue shown in Fig. 1 disclosing details of its construction.

Referring now to the drawing, and particularly to Fig. 1, 10 denotes a water supply main which leads from any suitable source, for example, a city distributing system, and is connected to a lower or inlet point of a tank in the water storage reservoir system employed in accordance with the invention. This reservoir system, as seen in Fig. 2, comprises a first or outer tank 11 (tank 11 being connected to water supply 10) and a second or inner tank 12 that is separate from and of generally less volume than the first tank. In the system shown tank 12 is nested or disposed in a cylindrical open space formed in tank 11, there being an annular clearance space, as shown at 13, provided between the two tanks which is filled with a suitable material of a heat insulating nature, for example, mineral wool. The nested tanks are supported in any convenient manner, for example, by a frame, as shown at 10x.

The outer tank 11 is tapped at some suitable point near its top and a water conduit 14 led therefrom to connect with the inlet end of a heating coil 15 of a suitable gas water heater that is disposed in operative association with the storage water tanks. This heater is shown as comprising a casing 16 enclosing coil 15 and provided with a gas burner 17 disposed below the coil 15. The casing 16 is preferably provided at its lower end with a damper or adjustable closure 18 for regulating the admission of air to the burner for combustion purposes. At the upper end, a flue 19 is provided to lead away the products of combustion.

In accordance with the practice of the present invention, the flue 19 is not led directly to a vent or chimney, but is connected to discharge into a heating passage 20 extending longitudinally through the inner tank 12. At the far end of the passage 20 a double elbow or U-shaped flue portion 21 leads the flue gases to a return passage 22 that is provided longitudinally through the upper portion of the outer tank 11; the exit from the passage 22 communicating with a flue portion 23 that leads to the vent or chimney. The flue portion 23 is also preferably provided with a damper as shown at 24 which is adapted to be operated in conjunction with the damper 18 as hereinafter more fully explained.

A water conduit 25 leads from the exit end of the heating coil 15 and is tapped into an intermediate point in an end of inner tank 12.

The upper portion of the tank 12 is also tapped and has leading therefrom a water exit conduit 26 adapted for supplying hot water to the house distributing system. The tank 12 is also tapped at some lower point and has leading therefrom a water conduit 27 that includes a check valve 28 and communicates with a lower portion of the heating coil 15. This connection permits the water that has cooled in the inner tank 12 to be withdrawn into the heating coil for reheating and returned before being withdrawn for use. The burner 17 is here shown as supplied with heating gas conveyed through a conduit 29. The nested tanks 11 and 12 are also provided as a unit with a suitable insulating envelope 30 so as to conserve, as far as practicable, the heat within the reservoir system. This insulating envelope may be extended to include the flues 19 and 21, and also the casing 16 of the gas water heater when desired.

In order that the water in the storage system may be readily maintained at a desired temperature, particularly that in the inner tank 12, a suitable automatic control is provided, for example, a thermostatic control of the gas to the burner 17. A suitable device of this character is shown in Fig. 3 and is indicated in Fig. 1 as extending into the inner tank 12 at a suitable point in the end adjacent the gas water heater and operates upon a valve in gas supply conduit 29.

The type of thermostat shown in Fig. 3 is of the solid expanding element variety and comprises an expansible tube 31 having within a relatively inexpensive rod 32. The inner end of the tube 31 is closed by a plug or abutment 33 for rod 32 while the outer end of the tube is secured to a casing 34 that houses a lever system 35 that controls the gas. To accomplish this, the free end 36 of the lever system is connected to the stem 37 of a disc valve 38 disposed to control conduit 29. By this arrangement, it is seen that when the water in the tank 12, that is in contact with the tube 31, has cooled sufficiently to contract the tube, the lever system is moved so as to open the gas valve whereby the gas heater is set into operation. This continues until the water has attained the desired temperature when the reverse operations take place and close valve 38.

In order that there may be an adequate supply of air for the burner 17 when the gas is turned on, and at the same time avoid cooling drafts through the flues when the burner is not in operation, the dampers 18 and 24 are preferably arranged to be operated simultaneously with the gas valve 38. To this end they are connected by means of a cable 40 that is actuated by means of a bell crank lever 41 disposed adjacent to the thermostat and provided with an arm connected directly for actuation by an extension 42 of the gas valve stem 37. Thus it is seen that when the thermostat operates, it not only opens the gas valve when the water in the inner tank has dropped to too low a temperature, but also moves the cable 40 simultaneously with the motion of the gas valve so as to admit freely a supply of air for combustion. By this arrangement the dampers 18 and 24 are also closed at the same time the gas valve closes.

In order to avoid the condensation and collection of moisture from the flue gases when cooled below the dew point in the flues 19, 21 and 23 at undesired points which otherwise would induce rusting and/or undesired cooling, the double elbow 21 is preferably provided with one or more moisture traps or evaporating pans, as shown in Fig. 4. Here the lower elbow is shown as provided with a depending pan 210 while the upper elbow is provided with an annular or constricting pan 211. By such means, it is seen that the elbows will collect the moisture at desired points when the flue gases traversing the same are chilled below the dew point, this condensate when later heated being caused to evaporate.

In operation it is seen that water from the water supply 10 first enters and fills the tank 11 of the storage water system and then successively traverses the heating coil 15 and enters the inner tank 12 where it is retained until withdrawn by a demand on the house hot water distributing system. The thermostatic means here provided is seen to control the supply of heating agent and to admit the same whenever the water in the tank 12 drops below a predetermined temperature and to turn off the heating agent as soon as the predetermined temperature desired is again attained in tank 12. The circulation connection 27 induces the circulation of water through the heating coil 15 from the lower part of tank 12 to an intermediate point thereof when no hot water is being drawn from the system but when gas valve 38 has been opened by the thermostat. Tank 12 is thus at all times filled with a desired amount of water heated to the temperature desired to be maintained.

The nested relation of the tanks 11 and 12 insures that the heat lost by radiation from the tank 12 which is at the higher temperature is absorbed by and imparted to the water in the tank 11. This transfer is partly through conduction but mainly through radiation. The water in the tank 11 is thus tempered and raised to a temperature somewhat above that of the incoming water of the supply system but below that of the tank 12. Hence the water entering the water heater requires less heating to bring it to the temperature desired in tank 12. The graded temperatures of the water in the tanks 11 and 12 is thus in the interests of mutual heat conservation and induces a relatively complete absorption of the heat lost from the inner tank 12 so that the overall efficiency of the present system is relatively high.

When the gas is being supplied to the gas burner 17, the dampers 18 and 24 are also open so that there is a free flow of heated gases from the heater casing 16 through the passages 20 and 22 to the vent into which the flue 23 discharges. These flue gases are seen to heat first the water at the high temperature and then when somewhat cooled the water at the lower temperature. In this way heating of the water by the flue gases even at relatively low temperatures is carried out with relatively high efficiency since the temperature difference is relatively constant, the higher temperature water being heated by the flue gases at the higher temperature while the lower temperature water is heated by the flue gases that have already given up some heat. The absorption of heat by the water at all points is thus of a relatively high order and reverse heating effects are avoided.

The heat from the flue gases traversing elbows 21 is seen here to cause the moisture that has collected in the moisture traps and pans to evaporate, so that the heating efficiency of the flues 19, 20 and 22 is maintained. The passage of flue gases continues until the supply of gas to the burners is cut off when the dampers 18 and 24 are closed, as previously pointed out. Consequently there is no afterdraft of cooling air through the tanks 11 and 12 which would otherwise tend to dissipate the heat of the water in the storage tanks when the gas burner is not in operation.

While the heated water has here been illustrated as supplied to a house distributing system for domestic use, it is obvious that the parts may be so proportioned as to supply heated water for a house heating system, the usual risers being, in such case, connected directly to the inner storage water tank, while the return may be connected to the outer tank.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a system for heating water for domestic use, the combination with a water supply, of a gas water heater, a storage water system comprising a pair of reservoirs connected in series and having said water heater in series therebetween, said reservoirs having flue passages therein for the supplementary heating of the water, and flue connections leading from said water heater to said flue passages, and flue conduits connecting said water heater and said flue passages in series in the inverse order of the water connections.

2. In a system for heating water for domestic use, the combination with a water supply, of a gas water heater, a storage water system comprising a pair of reservoirs connected in series and having said water heater in series therebetween, said reservoirs having flue passages therein for the supplementary heating of the water, flue connections leading from said water heater to said flue passages and flue conduits connecting said water heater and said flue passages in series in the inverse order of the water connections, and automatic means associated with said reservoirs for controlling the gas supply to said water heater.

3. In a system for heating water for domestic use, the combination with a water supply, of a water heater having a burner and a gas supply connection, a water storage system comprising a pair of reservoirs connected in series and having said water heater interposed therebetween, the first reservoir in the series leading from said water supply having an open space in which said second reservoir is housed, said reservoirs each being provided with flue gas passages, flue gas conduits for connecting said water heater and flue gas passages in series in the inverse order of the water connections, and means associated with said conduits for trapping and later evaporating the moisture precipitated when said flue gases cool below the dew point.

4. In a system for heating water for domestic use, the combination with a water supply, of a water heater having a burner and a gas supply connection, a water storage system comprising a pair of reservoirs connected in series and having said water heater interposed therebetween, the first reservoir in the series leading from said water supply having an open space in which said second reservoir is housed, said reservoirs each being provided with flue gas passage, flue gas conduits for connecting said water heater and flue gas passages in series in the inverse order of the water connections, and thermostatic means associated with the second reservoir for controlling the supply of gas to said burner.

5. In a system for heating water for domestic use, the combination with a water supply, of a water heater having a burner and a gas supply connection, a water storage system comprising a pair of reservoirs connected in series and having said water heater interposed therebetween, the first reservoir in the series leading from said water supply having an open space in which said second reservoir is housed, said reservoirs each being provided with flue gas passages, flue gas conduits for connecting said water heater and flue gas passages in series in the inverse order of the water connections, damper means for controlling the passage of gaseous media through said flue gas conduits, and thermostatic means for controlling both said damper means and said gas supply.

6. In a system for heating water for domestic use, the combination with a water supply, of a water heater having a burner and a gas supply connection, a water storage system comprising a pair of reservoirs connected in series and having said water heater interposed therebetween, the first reservoir in the series leading from said water supply having an open space in which said second reservoir is housed, said reservoirs each being provided with flue gas passages, flue gas conduits for connecting said water heater and flue gas passages in series in the inverse order of the water connections, closure means controlling the admission of air to said burner, damper means controlling the exit of products of combustion from said conduits, valve means controlling the supply of gas to said burner, and thermostatic means simultaneously actuating said closure means, said damper means and said valve means.

7. In a system for heating water for domestic use, the combination with a water supply, of a service connection, a pair of spaced water storage reservoirs in nested relation having the outer reservoir connected to said water supply and the inner reservoir connected to said service connection, another connection connecting said inner and outer reservoirs in series, a gas water heater in said other connections in series with said reservoirs, and flue means in heat exchanging relation with said reservoirs for conserving the heat of the waste gases from said water heater.

8. In a system for heating water for domestic use, the combination with a water supply, of a service connection, a pair of spaced water storage reservoirs in nested relation having the outer reservoir connected to said water supply and the inner reservoir connected to said service connection, another connection connecting said inner and outer reservoirs in series, a gas water heater in said other connection in series with said reservoirs, flue means in heat exchanging relation with said reservoirs for conserving the heat of the waste gases from said water heater, and thermostatic means controlling said water heater and provided with connections for simultaneously controlling the passage of waste gases from said water heater.

CLYDE MALIN REES.